Patented Mar. 26, 1935

1,995,499

UNITED STATES PATENT OFFICE 1,995,499

PROCESS FOR TREATING WOOD

Ira H. Derby and Francis Edward Cislak, Indianapolis, Ind., assignors to Peter C. Reilly, Indianapolis, Ind.

No Drawing. Application September 17, 1931, Serial No. 563,352

4 Claims. (Cl. 99—12)

Our invention relates to the treatment of wood, especially certain kinds of wood, with preservative liquids such, for example, as creosote oil.

Different kinds of wood vary widely in their ability to absorb liquid preservatives. Some woods, such as red oak, yellow pine, etc., readily absorb preservative liquids, and thus find a wide use in situations where wood treated with a preservative is necessary. Other woods, notably the conifers Douglas fir, spruce, and hemlock, absorb preservative liquids far less readily. In fact, the capacity of some of these woods to absorb preservative liquids is so slight that it is difficult, if not impossible, to impregnate them with sufficient preservative liquid to adapt them for use in situations where a treated wood is necessary. Some of such woods are available in large quantities, but because they are not susceptible to treatment with preservative liquids, their field of use is greatly restricted.

It is the object of our invention to facilitate the impregnation with creosote oil, zinc chloride solution, or other preservative liquid of those woods, such as Douglas fir, hemlock, etc., which, by reason of their physical structure or other characteristics, have little absorptive capacity, and thus to make them available for uses to which they are not naturally adapted.

When a liquid is absorbed by wood of any coniferous variety it passes from cell to cell of the wood through membranes which extend across openings in the secondary walls of the wood-cells. These membranes permit the ready passage of those liquids which flow through the wood in the growing tree, but they seem to be of such a nature, in such woods as Douglas fir, hemlock, etc., as to resist or wholly prevent the passage of the known preservative liquids. This may be due to the greater viscosity of the preservative liquids, or it may be due to surface or interfacial tension phenomena, or to some other cause.

It has occurred to us that if the membranes previously referred to can be rendered more permeable to a preservative liquid it might thereby be possible to increase greatly the ability of the wood to absorb such preservative liquid. It is generally conceded that the membranes are composed wholly or in large part of lignin; and it would therefore appear probable that if a difficultly penetrable wood were subjected to a preliminary treatment with some substance which would act upon the lignin in such a way as to facilitate the later passage of preservative liquids through the lignin membranes, the ability of the wood to absorb such a liquid would be markedly increased.

This theory just set forth we have found to be borne out by the results of numerous tests which we have made. We have developed a number of different methods by which wood can be preliminarily treated to increase its capacity to absorb a preservative liquid. While these methods vary considerably in detail, they all have for their purpose the treatment of the lignin constituent of the wood with a substance which will act upon the membranes in such a way as to prevent them from seriously opposing the passage of the preservative liquid through them.

We have found that the agents which act upon the lignin membranes may be either gases or liquids. As an example of gases which will act upon lignin to secure the result we desire we may mention sulphur dioxide; which is the gas to which the present application is directed.

One method of treating the wood with such a gas, is to place it in a closed vessel into which the gas, either concentrated or diluted with an inert diluent such as air, is introduced. If desired, the vessel may be partially or wholly exhausted before introducing the gas. We find that the pressure of the gas within the treating vessel is more or less immaterial, except for its obvious effect on the duration of treatment, and may vary widely. After the treatment of the wood has continued for a length of time sufficient to insure penetration of and action on the wood by the gas, the wood is removed from the vessel and allowed to season in order to permit the escape of any excess gas. After the above treatment, it will be found that the ability of the wood to absorb creosote oil or other preservative liquid is markedly increased.

As previously mentioned, the substance used to treat the lignin membranes may be in liquid form. Thus, the wood may be immersed in a 7% solution of sulphur dioxide in water and then dried in air. The amount of creosote oil or other preservative liquid which the wood will later absorb will be found to be markedly increased by this preliminary treatment.

It may be that in the treatment of the wood as outlined above the treating substance, here sulphur dioxide, will form solid toxic substances which are deposited in the cells of the wood, as by some reaction with wood-constituents. Our present application, however, is directed to methods of treating the wood to facilitate its impregnation by liquid preservatives, and any effect of the sulphur dioxide in forming toxic compounds is merely incidental.

We are aware that in the past wood has been treated to increase its porosity by subjecting it for a sufficient length of time to the action of reagents which practically completely destroy the lignin structure of the wood. This method of treatment can obviously be used only in situations where the strength of the wood is of very little or no importance, and is wholly unsuited to our purpose.

The treating substance, here sulphur dioxide, which we employ in our process, is capable of seriously damaging the lignin structure of the wood if permitted to act thereon for a sufficient length of time, and it is therefore essential that in our process the treatment of the wood should not be unduly prolonged. To have a deleterious effect upon the lignin structure, however, the treatment of the wood must be continued for a far longer time than is necessary to secure the benefits of our invention.

It will be readily apparent that the amount of time required for the treatment of wood to secure the benefits of our invention will depend upon the concentration of the treating agent, upon its pressure if a gas, and upon the depth of penetration desired, the duration of treatment being increased with weaker concentrations, lower pressures, or for greater depth of penetration.

The various methods for the treatment of wood set forth above are merely examples of a number of ways in which our invention can be carried out, and our invention is not to be construed as limited to them. While we have been led to develop the methods of wood-treatment above set forth through the above mentioned theory of action of the treating substances on the lignin membranes, we do not wish to be understood as making our invention dependent in any way upon the truth of that theory.

We have treated a number of species of the coniferous woods by one or more of the above mentioned methods and have found that the permeability of any of them to the preservative fluids is thereby markedly increased. The amount of preservative liquids which such woods as Douglas fir, spruce, and hemlock, absorb, after being subjected to one of the methods of treatment which we have developed, may exceed by 50% or more the quantity of such liquids which an untreated wood will absorb. We believe our invention will prove especially valuable in the treatment of Douglas fir, particularly the mountain variety of Douglas fir; as that wood is available in large quantity and is exceedingly difficult to treat by preservative methods in common use.

We are not particularly concerned with the nature of the preservative which is used in our process, but we prefer to use either creosote oil or an aqueous solution of zinc chloride.

We claim as our invention:

1. A process of treating wood which consists in introducing into the wood sulphur dioxide gas and thereafter impregnating the wood with a preservative liquid.

2. A process of treating wood which consists in introducing sulphur dioxide into the wood and thereafter impregnating the wood with a preservative liquid.

3. A process of treating wood which consists in introducing into the wood sulphur dioxide gas and thereafter impregnating the wood with creosote oil.

4. A process of treating wood which consists in introducing sulphur dioxide into the wood and thereafter impregnating the wood with creosote oil.

IRA H. DERBY.
FRANCIS EDWARD CISLAK.